United States Patent
Tokutake

(10) Patent No.: US 12,106,439 B2
(45) Date of Patent: Oct. 1, 2024

(54) DEVICE AND ASSOCIATED METHODOLOGY FOR SUPPRESSING INTERACTION DELAY OF INTERACTING WITH A FIELD OF VIEW OF A MOBILE TERMINAL ON A DIFFERENT DISPLAY

(71) Applicant: Sony Group Corporation, Tokyo (JP)

(72) Inventor: Kenji Tokutake, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 202 days.

(21) Appl. No.: 17/289,729

(22) PCT Filed: Jul. 21, 2020

(86) PCT No.: PCT/JP2020/028341
§ 371 (c)(1),
(2) Date: Apr. 29, 2021

(87) PCT Pub. No.: WO2022/018836
PCT Pub. Date: Jan. 27, 2022

(65) Prior Publication Data
US 2022/0309754 A1    Sep. 29, 2022

(51) Int. Cl.
G06T 19/00    (2011.01)
G06T 13/20    (2011.01)
G06T 15/20    (2011.01)

(52) U.S. Cl.
CPC .......... G06T 19/006 (2013.01); G06T 15/205 (2013.01)

(58) Field of Classification Search
None
See application file for complete search history.

(56) References Cited

U.S. PATENT DOCUMENTS

| | | | |
|---|---|---|---|
| 5,850,352 A | 12/1998 | Moezzi | |
| 8,687,000 B2* | 4/2014 | Panahpour Tehrani | G06T 15/405 345/422 |
| 10,176,590 B2* | 1/2019 | Sakamoto | G06T 15/205 |
| 10,403,050 B1* | 9/2019 | Beall | G06T 7/292 |
| 10,999,535 B2* | 5/2021 | Shuden | H04N 5/272 |
| 11,354,849 B2* | 6/2022 | Arai | G06T 19/00 |
| 2008/0259199 A1 | 10/2008 | Sako | |

(Continued)

FOREIGN PATENT DOCUMENTS

| | | |
|---|---|---|
| JP | 2005-234224 A | 9/2005 |
| JP | 2008-147865 A | 6/2008 |

(Continued)

Primary Examiner — Michael J Cobb
(74) Attorney, Agent, or Firm — XSENSUS LLP

(57) ABSTRACT

An information processing device includes an acquisition unit, a generation unit, and an output unit. The acquisition unit acquires a viewpoint image according to a viewpoint of a first user from an image server, on the basis of position information indicating the position of a mobile terminal moving with the first user. The image server stores a plurality of viewpoint images obtained by capturing images from a plurality of orientations in each of a plurality of positions. The generation unit uses the acquired viewpoint image to generate a rendering image rendered from a free viewpoint specified by a second user who is located at a position different from that of the first user, as a display image. The output unit outputs the generated display image.

20 Claims, 10 Drawing Sheets

(56) References Cited

U.S. PATENT DOCUMENTS

| | | | |
|---|---|---|---|
| 2015/0043784 A1 | 2/2015 | Flint | |
| 2016/0357491 A1* | 12/2016 | Oya | G06F 3/1423 |
| 2018/0063514 A1* | 3/2018 | Mizuno | G06F 3/14 |
| 2018/0343442 A1 | 11/2018 | Yoshikawa | |
| 2019/0208231 A1* | 7/2019 | Kitasei | H04L 65/762 |
| 2019/0349531 A1* | 11/2019 | Aizawa | H04N 23/62 |
| 2022/0101593 A1* | 3/2022 | Rockel | A63F 13/426 |
| 2022/0146821 A1* | 5/2022 | Saito | G06F 3/011 |

FOREIGN PATENT DOCUMENTS

| | | |
|---|---|---|
| JP | 2012-204991 A | 10/2012 |
| JP | 2013-115590 A | 6/2013 |
| JP | 2017-10119 A | 1/2017 |
| JP | 2018-502360 A | 1/2018 |
| JP | 2019-121867 A | 7/2019 |
| JP | 2019-145017 A | 8/2019 |
| WO | 2016/088437 A1 | 6/2016 |

\* cited by examiner

DEVICE AND ASSOCIATED METHODOLOGY FOR SUPPRESSING INTERACTION DELAY OF INTERACTING WITH A FIELD OF VIEW OF A MOBILE TERMINAL ON A DIFFERENT DISPLAY

CROSS-REFERENCE TO RELATED APPLICATION

The present application is based on PCT filing PCT/JP2020/028341, filed Jul. 21, 2020, the entire contents of which are incorporated herein by reference.

FIELD

The present disclosure relates to an information processing device, an information processing method, and a program.

BACKGROUND

There are known recent monitoring services that notify guardians of the locations and movements of users being targets to be monitored, on the basis of the position information about mobile terminals, such as mobile phones or Bluetooth (registered trademark) low energy (BLE) tags, moving with the users being targets to be monitored, such as children.

Furthermore, as a service using augmented reality (AR) technology, there is known a service that guides a user wearing a head mounted display (HMD) along a route. A device, such as the HMD, that achieves the AR technology can display an image indicating a position and direction according to the movement of the user's viewpoint by using, for example, a 360-degree image captured by a 360-degree camera.

CITATION LIST

Patent Literature

Patent Literature 1: JP 2018-502360 A

SUMMARY

Technical Problem

However, the image data of the 360-degree image is large in amount. Therefore, for example, in displaying the field of view of a user of a mobile terminal on a display terminal such as the HMD used by a user located at a different position, the amount of data transferred from the mobile terminal to the display terminal becomes large, and the large amount of data causes a delay in interaction, in some cases.

Therefore, the present disclosure proposes an information processing device, an information processing method, and a program that are configured to suppress a delay in interaction upon displaying the field of view of the user of the mobile terminal on the display terminal used by the user located at a different position.

Solution to Problem

According to the present disclosure, an information processing device includes an acquisition unit, a generation unit, and an output unit. The acquisition unit acquires a viewpoint image according to a viewpoint of a first user from an image server, on the basis of position information indicating the position of a mobile terminal moving with the first user. The image server stores a plurality of viewpoint images obtained by capturing images from a plurality of orientations in each of a plurality of positions. The generation unit uses the acquired viewpoint image to generate a rendering image rendered from a free viewpoint specified by a second user who is located at a position different from that of the first user, as a display image. The output unit outputs the generated display image.

DESCRIPTION OF EMBODIMENTS

Figure 1:
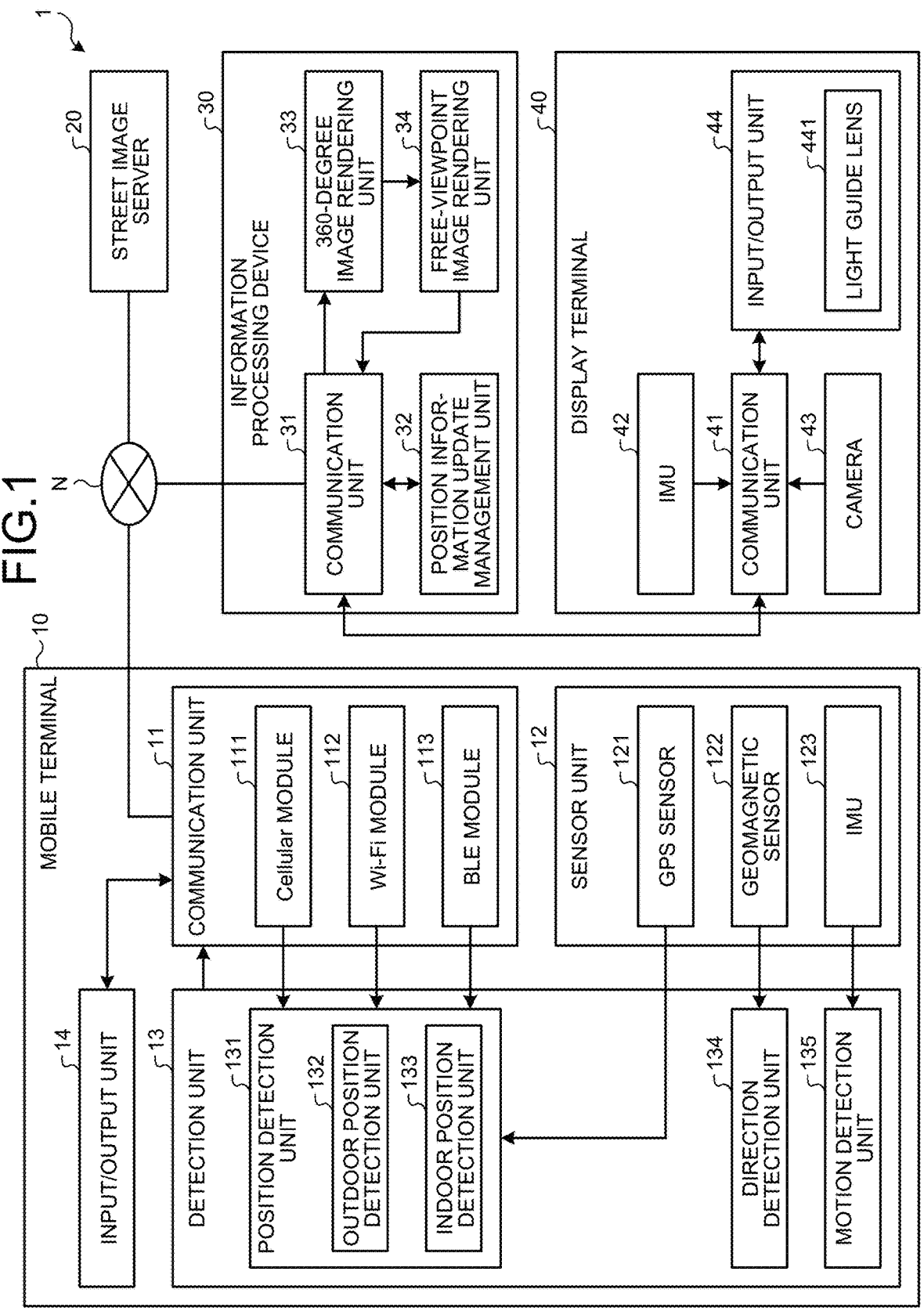
FIG. 1 is a block diagram illustrating an example of a configuration of an information processing system according to an embodiment of the present disclosure.

Hereinafter, embodiments of the present disclosure will be described in detail with reference to the drawings. Note that in the following embodiments, the same portions will be designated by the same reference numerals and symbols, and further redundant description thereof is omitted.

The present disclosure will be described in the order of items shown below.

1. Embodiment
1-1. Functional configuration of information processing system according to embodiment
1-2. Example of information processing according to embodiment
1-2-1. Update of display image according to movement of target or free viewpoint
1-2-2. Update of display image according to movement of target both indoors and outdoors
1-2-3. Generation of display image without using viewpoint image
1-3. Information processing procedure according to embodiment
1-4. Use examples of information processing system according to embodiment
1-5. Hardware configuration
2. Effects of information processing system according to present disclosure 1. Embodiment The present embodiment exemplifies a monitoring service that acquires the position information of a mobile terminal that moves together with a first user who is a target to detect the location and movement of the first user. Specifically, in the embodiment, an information processing system is exemplified that displays an image corresponding to the field of view of the first user, for a second user who is located at a position different from that of the first user, on the basis of the position information of the mobile terminal, without receiving image data from the mobile terminal. In the following description, it is assumed that the first user is a child who moves with the mobile terminal. Furthermore, it is assumed that the second user is a guardian who monitors the location and movement of the child by using the monitoring service achieved by the information processing system according to the embodiment.

[1-1. Functional Configuration of Information Processing System According to Embodiment]

An example of a functional configuration of an information processing system 1 according to an embodiment will be described with reference to FIG. 1. FIG. 1 is a block diagram illustrating the example of the configuration of the information processing system 1 according to an embodiment of the present disclosure.

As illustrated in FIG. 1, the information processing system 1 according to the embodiment includes a mobile terminal 10, a street image server 20, an information processing device 30, and a display terminal 40. The mobile terminal 10, the street image server 20, and the information processing device 30 are communicably connected to each other via a network N. Furthermore, the information processing device 30 and the display terminal 40 are communicably connected to each other. As the network N, a telecommunication line such as the Internet can be used.

Note that the mobile terminal 10 and the street image server 20 may be connected to the information processing device 30 via different networks N. Furthermore, the information processing device 30 and the display terminal 40 may be communicably connected via the network N.

The mobile terminal 10 is a communication terminal that moves with a child. The mobile terminal 10 executes a program (application) for achieving information processing according to the present disclosure and functions as the mobile terminal 10 according to the present disclosure. As the mobile terminal 10, a dedicated terminal may be used or a general communication terminal such as a smartphone may be used.

As illustrated in FIG. 1, the mobile terminal 10 has functions as a communication unit 11, a sensor unit 12, a detection unit 13, and an input/output unit 14.

The communication unit 11 is connected to the network N in a wireless manner to communicate with the information processing device 30 via the network N. As illustrated in FIG. 1, the communication unit 11 includes a cellular module 111, a Wi-Fi (registered trademark) module 112, and a Bluetooth (registered trademark) low energy (BLE) module 113. The cellular module 111 is a communication circuit compatible with various standards such as 3G, 4G, and 5G. The Wi-Fi module 112 is a communication circuit compatible with the Wi-Fi standard. The BLE module 113 is a communication circuit compatible with the BLE standard.

In one example, the communication unit 11 establishes communication with a mobile-phone base station by the cellular module 111 and outputs information indicating the mobile-phone base station for which communication has been established or the position thereof, to the detection unit 13. The communication unit 11 establishes communication with the Wi-Fi access point by the Wi-Fi module 112 and outputs information indicating the Wi-Fi access point with which communication is established, or the position there of, to the detection unit 13. The communication unit 11 receives a BLE beacon from a BLE tag or the like by the BLE module 113 and outputs information indicating the radio-wave strength of the received BLE beacon, the BLE tag or the like that has transmitted the received BLE beacon, or the position of the BLE tag, to the detection unit 13. In addition, the communication unit 11 transmits information indicating the position, direction, and movement of the mobile terminal 10 detected by the detection unit 13, to the information processing device 30. Here, the information indicating the position of the mobile terminal 10 has, for example, latitude and longitude values. The information indicating the movement of the mobile terminal 10 is, for example, information indicating the start of movement of the mobile terminal 10 or information indicating a stationary state of the mobile terminal 10.

The sensor unit 12 detects the position, direction, and movement of the mobile terminal 10. Furthermore, the sensor unit 12 outputs the detected information indicating the detected position, direction, and movement of the mobile terminal 10, to the detection unit 13. As illustrated in FIG. 1, the sensor unit 12 includes a global positioning system (GPS) sensor 121, a geomagnetic sensor 122, and an inertial measurement unit (IMU) 123.

In one example, the sensor unit 12 detects the latitude and longitude of the mobile terminal 10 by the GPS sensor 121 and outputs information indicating the detected latitude and longitude to the detection unit 13. The sensor unit 12 detects the direction of the mobile terminal 10 by the geomagnetic sensor 122 and outputs information indicating the detected direction to the detection unit 13. The sensor unit 12 detects the acceleration and angular velocity of the mobile terminal 10 by the IMU 123, and outputs information indicating the detected acceleration and angular velocity to the detection unit 13. Here, the information indicating the acceleration and the angular velocity can also be expressed as information indicating a change in position and attitude of the mobile terminal 10.

The detection unit 13 detects information indicating the position, direction, and movement of the mobile terminal 10 on the basis of outputs of the communication unit 11 and the sensor unit 12. Furthermore, the detection unit 13 outputs the detected information indicating the detected position, direction, and movement of the mobile terminal 10, to the communication unit 11. As illustrated in FIG. 1, the detection unit 13 has functions as a position detection unit 131, a direction detection unit 134, and a motion detection unit 135. The position detection unit 131 has functions as an outdoor position detection unit 132 and an indoor position detection unit 133.

The outdoor position detection unit 132 detects the information indicating the position of the mobile terminal 10 on the basis of output of at least one of the cellular module 111, the GPS sensor 121, and the Wi-Fi module 112. The indoor position detection unit 133 detects information indicating the indoor position of the mobile terminal 10, on the basis of output of at least one of the Wi-Fi module 112 and the BLE module 113. The indoor position of the mobile terminal 10 includes the height (floor, story) at which the mobile terminal 10 is located. The direction detection unit 134 detects information indicating the direction of the mobile terminal 10, on the basis of an output of the geomagnetic sensor 122. The motion detection unit 135 detects information indicating the direction of the mobile terminal 10, on the basis of an output of the IMU 123.

Note that the position detection unit 131 may be configured to estimate the current position of the mobile terminal 10, on the basis of the information indicating the position of the mobile terminal 10 detected last and information indicating the direction and movement of the mobile terminal 10 detected at the present time.

The input/output unit 14 receives an input of the user's voice. The input/output unit 14 outputs received voice data to the communication unit 11. Furthermore, the input/output unit 14 outputs a voice according to voice data received from the information processing device 30 or the display terminal 40 by the communication unit 11. The input/output unit 14 includes an input device such as a microphone and an output device such as a speaker.

Note that the input/output of the voice via the input/output unit 14 represents, for example, a call with a user (guardian) who uses the display terminal 40, but may include recording and playback of a voice message, or may include conversion of voice into text data and conversion of text data into voice.

Note that when the child can use a function as the input/output unit 14 by another device, for example, when the child has another communication terminal such as a smartphone, the mobile terminal 10 may not have the input/output unit 14.

The street image server 20 is an image server (server device) configured to stores a database for a plurality of viewpoint images (street image, 360-degree image) obtained by capturing images from a plurality of orientations (directions) in each of a plurality of positions. It is assumed that each of the plurality of viewpoint images stored in the street image server 20 is associated with information indicating a position and direction of the image captured. Furthermore, it is assumed that each of the plurality of viewpoint images stored in the street image server 20 is an image in which an object unintendedly captured is appropriately processed. As the street image server 20, for example, Google Street View (registered trademark) can be used.

The information processing device 30 generate an image that corresponds to the field of view of the child, visible from a free viewpoint specified by the guardian, on the basis of the information indicating the position of the mobile terminal 10 moving with the child, without receiving image data from the mobile terminal 10, and outputs the image to the display terminal 40 used by the guardian. The information processing device 30 executes a program (application) for achieving information processing according to the present disclosure and functions as the information processing device 30 according to the present disclosure. As the information processing device 30, a general communication terminal such as a smartphone, or a device such as a personal computer (PC) or a tablet PC can be appropriately used.

As illustrated in FIG. 1, the information processing device 30 has functions as a communication unit 31, a position information update management unit 32, a 360-degree image rendering unit 33, and a free-viewpoint image rendering unit 34.

The communication unit 31 is connected to the network N in a wireless manner to communicate with the mobile terminal 10 and the street image server 20 via the network N. The communication unit 31 receives the information indicating the position, direction, and movement of the mobile terminal 10, from the mobile terminal 10. The communication unit 31 transmits a viewpoint image request from the position information update management unit 32 to the street image server 20. The communication unit 31 receives a viewpoint image according to the viewpoint image request, from the street image server 20. Furthermore, the communication unit 31 transmits a free-viewpoint image generated by the free-viewpoint image rendering unit 34 to the display terminal 40. The communication unit 31 receives information indicating 6DoF (degree of freedom) movement of the display terminal 40 from the display terminal 40. The communication unit 31 includes a communication circuit for wired communication, a communication circuit for wireless communication, and a combination thereof. As the communication circuit for wireless communication, a communication circuit compatible with various standards such as 3G, 4G, 5G, Wi-Fi, and BLE can be appropriately used. Here, the communication unit 31 is an example of an acquisition unit and an output unit.

The position information update management unit 32 outputs the viewpoint image request for requesting a viewpoint image from the street image server 20, to the communication unit 31, on the basis of the information indicating the detected position, direction, and movement of the mobile terminal 10 received by the communication unit 31. The position information update management unit 32 outputs the viewpoint image request when the amount of movement of the mobile terminal 10 exceeds a predetermined threshold value. Furthermore, the position information update management unit 32 outputs the viewpoint image request when the free viewpoint moves with the movement of the display terminal 40, for example, when the guardian wearing the display terminal 40 moves. Here, the position information update management unit 32 is an example of the acquisition unit.

The 360-degree image rendering unit 33 performs rendering processing for generating a 360-degree image for display, on the basis of a viewpoint image from the street image server 20. The 360-degree image rendering unit 33 outputs a generated 360-degree image for display to the free-viewpoint image rendering unit 34. Here, the 360-degree image rendering unit 33 is an example of a generation unit.

The free-viewpoint image rendering unit 34 performs rendering processing to generate a rendering image rendered from the free viewpoint according to the field of view of the display terminal 40, on the basis of a 360-degree image generated by the 360-degree image rendering unit 33 and specification of the free viewpoint from the display terminal 40. Hereinafter, the rendering image rendered from the free viewpoint, generated in the present processing, is described as the free-viewpoint image. Note that, in one example, the specification of the free viewpoint from the display terminal 40 represents specification of the free viewpoint based on an output of an IMU 42 and/or a camera 43 of the display terminal 40. In other words, specification of the free viewpoint includes perception of 6DoF (degree of freedom) movement of the display terminal 40 in a three-dimensional space. The free-viewpoint image rendering unit 34 outputs a generated free-viewpoint image to the display terminal 40 via the communication unit 31. Here, the free-viewpoint image rendering unit 34 is an example of the generation unit.

The display terminal 40 displays a free-viewpoint image that expresses a field of view of the child at a free-viewpoint, generated on the basis of position information of the mobile terminal 10. The display terminal 40 is a display terminal device configured to achieve a service using an augmented reality (AR) technology. In one example, the display terminal 40 is a head mounted display (HMD) that is worn by a guardian. The display terminal 40 is, for example, an optical see-through type HMD. As illustrated in FIG. 1, the display terminal 40 has functions as a communication unit 41, a sensor unit, and an input/output unit 44. The sensor unit includes the IMU 42 and the camera 43.

The communication unit 41 receives a free-viewpoint image from the information processing device 30. In addition, the communication unit 41 transmits the information indicating the 6DoF movement of the display terminal 40 to the information processing device 30. The communication unit 41 includes a communication circuit for wired communication, a communication circuit for wireless communication, and a combination thereof. As the communication circuit for wireless communication, a communication circuit compatible with various standards such as 3G, 4G, 5G, Wi-Fi, and BLE can be appropriately used.

The sensor unit detects the information indicating the 6DoF movement of the display terminal 40. Specifically, the sensor unit detects the acceleration and angular velocity of the display terminal 40 by the IMU 42, and transmits information indicating the detected acceleration and angular velocity to the information processing device 30 via the communication unit 41. Furthermore, the sensor unit detects the movement or rotation of the display terminal 40 on the basis of, for example, the movement or deformation of a feature point on an image obtained by the camera 43, and transmits information indicating the detected movement or rotation to the information processing device 30 via the communication unit 41. In other words, the guardian wearing the display terminal 40 can specify the free viewpoint by movement or rotation of himself/herself without any special operation.

The input/output unit 44 receives an input of the user's voice. The input/output unit 44 outputs received voice data to the communication unit 41. Furthermore, the input/output unit 44 outputs a voice according to voice data received from the mobile terminal 10 or the information processing device 30 by the communication unit 41. The input/output unit 44 includes an input device such as a microphone and an output device such as a speaker. Furthermore, as illustrated in FIG. 1, the input/output unit 44 includes a light guide lens 441. In the display terminal 40 as the optical see-through type HMD, for example, a virtual image optical system using a half mirror or the light guide lens 441 that is transparent is held in front of the user's eyes, and an image is displayed inside the virtual image optical system. Therefore, the user wearing the optical see-through type HMD can see scenery around the user even while viewing an image displayed inside the virtual image optical system.

Note that the display terminal 40 may be, for example, a video see-through type HMD. The video see-through type HMD is worn by the user so as to cover the user's eyes, and a display of the video see-through type HMD is held in front of the user's eyes. Furthermore, the video see-through type HMD has the camera 43 to capture an image of scenery in front of the user, and the image of the scenery captured by the camera 43 is displayed on the display. Therefore, it is difficult for the user wearing the video see-through type HMD to directly see scenery in front of the user, but the user can confirm the scenery in front of him/her by an image on the display.

Note that the information processing device 30 and the display terminal 40 may be integrally configured.

[1-2. Example of Information Processing According to Embodiment]

Here, an overview of information processing according to an embodiment will be described with reference to FIGS. 2 and 3.

In a known recent monitoring service, a guardian is notified of the location or movement of a user being a target to be monitored such as a child, on the basis of the position information of the mobile terminal 10, such as a mobile phone or a BLE tag, that moves with the user being the target to be monitored.

In addition, a known service using AR technology guides a user wearing an HMD along a route. A device, such as the HMD, that achieves the AR technology can display an image (free-viewpoint image) indicating a position and direction according to the movement of the user's viewpoint by using, for example, a 360-degree image captured by a 360-degree camera.

Figure 2:
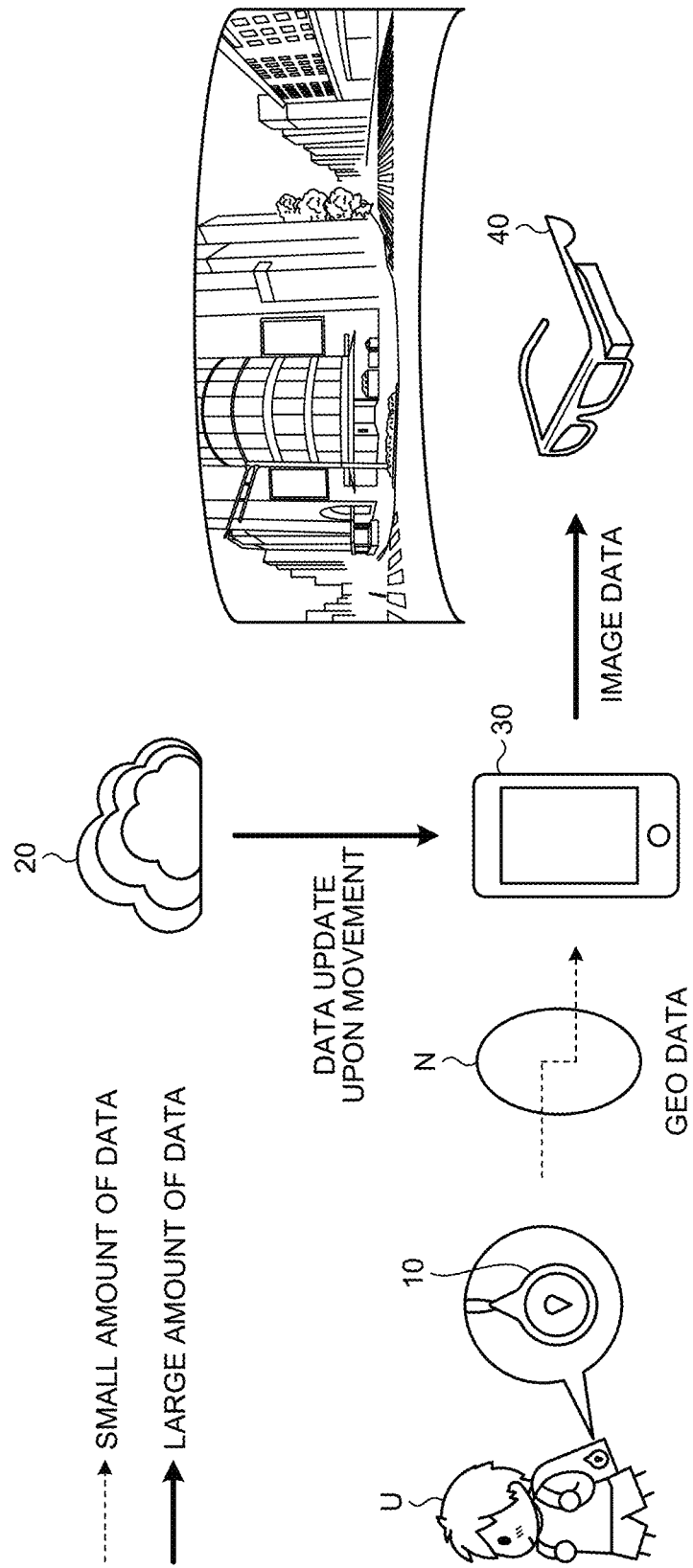
FIG. 2 is a schematic diagram illustrating an overview of information processing according to an embodiment of the present disclosure.

FIG. 2 is a schematic diagram illustrating an overview of information processing according to an embodiment of the present disclosure. The mobile terminal 10 is held by a child U who is the user being the target to be monitored and moves with the child U. The mobile terminal 10 transmits GEO data including position information of the mobile terminal 10 to the information processing device 30 via the network N. The information processing device 30 acquires a viewpoint image from the street image server 20 at timing of the movement of the target or the free viewpoint, on the basis of the GEO data from the mobile terminal 10, and generates a free-viewpoint image. The display terminal 40 displays the free-viewpoint image from the information processing device 30.

Meanwhile, consider that a free-viewpoint image is generated on the basis of a 360-degree image captured by the child U who is the target to be monitored. FIG. 3 is a schematic diagram illustrating an overview of other information processing for transmission of image data captured by a mobile terminal 10a', different from the information processing according to the embodiment of the present disclosure. In the example illustrated in FIG. 3, the mobile terminal 10a' is a 360-degree camera. Furthermore, a mobile terminal 10b' is a smartphone that transmits 360-degree moving video data captured by the mobile terminal 10a' to an information processing device 30' via the network N. In the information processing achieved by such a configuration, as illustrated in FIG. 3, an actual image can be transferred to the display terminal 40 in real time. In addition, the free-viewpoint image can be generated without using the street image server 20. Therefore, it is possible to achieve an information processing system that is not affected by a change such as the disappearance of a building after preparation of the street image server 20.

Figure 3:
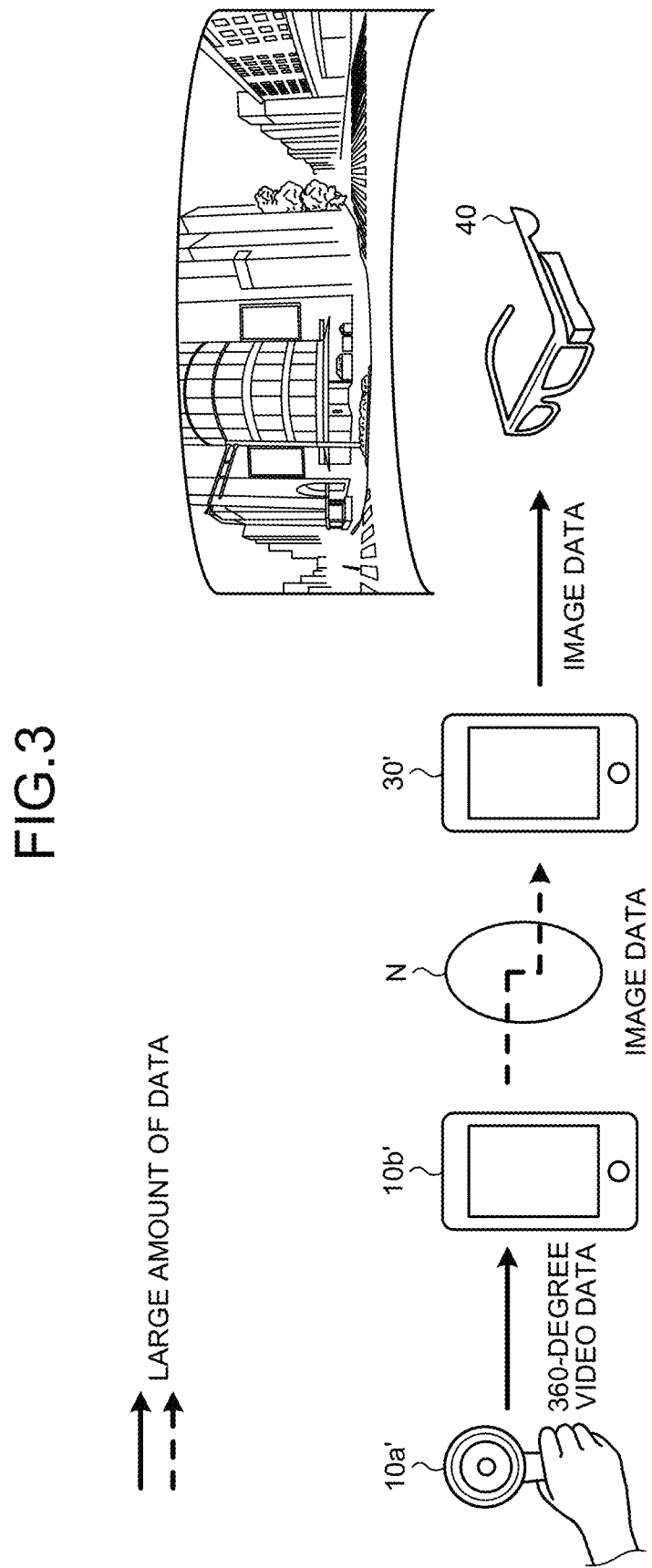
FIG. 3 is a schematic diagram illustrating an overview of other information processing for transmission of image data captured by a mobile terminal, different from the information processing according to an embodiment of the present disclosure.

However, in the example illustrated in FIG. 3, unlike the information processing according to the embodiment, the image data is transmitted even in communication between the mobile terminal 10*b*' and the information processing device 30'. Generally, image data showing a 360-degree image has a large amount of data. For example, the amount of data in this communication is as high as several hundred megabits per second. Therefore, for example, in displaying the field of view of the user of the mobile terminal 10 on the display terminal 40 such as the HMD used by the user located at a different position, the amount of data transferred from the mobile terminal 10 to the display terminal 40 becomes large, and the large amount of data may cause a delay in interaction, in some cases.

Therefore, the present disclosure proposes the information processing device 30, the information processing system 1, the information processing method, and a program that are configured to suppress a delay in interaction upon displaying the field of view of the user of the mobile terminal 10 on the display terminal 40 used by the user located at a different position. Specifically, in the information processing according to the embodiment, the 360-degree image data is not transmitted from the mobile terminal 10 to the information processing device 30, as illustrated in FIG. 2. For example, the amount of the GEO data (position information) transmitted from the mobile terminal 10 to the information processing device 30 is as low as several kilobits per second. Therefore, for example, in displaying the field of view of the user of the mobile terminal 10 on the display terminal 40 such as the HMD used by the user located at a different position, the amount of data transferred from the mobile terminal 10 to the display terminal 40 is small, and the small amount data makes it possible to suppress a delay in interaction.

In addition, capturing the 360-degree image may require complicated operations of the child U who is the user being the target to be monitored, in some cases. However, the information processing according to the embodiment does not require an operation to capture an image, in the mobile terminal 10 of the child U who is the user being the target to be monitored.

Furthermore, in the information processing according to the embodiment, the free-viewpoint image to be displayed on the display terminal 40 is generated on the basis of a viewpoint image acquired from the street image server 20. Here, the street image server 20 is an image server that is prepared in advance prior to the generation of the free-viewpoint image. In other words, it is possible to perform image processing, such as blurring, in advance on an object unintendedly captured, which is an unexpected object within an angle of view.

[1-2-1. Update of Display Image According to Movement of Target or Free Viewpoint]

Generation and update of a display image in the information processing according to the embodiment will be described with reference to FIGS. 4, 5, 6, and 7.

Figure 4:
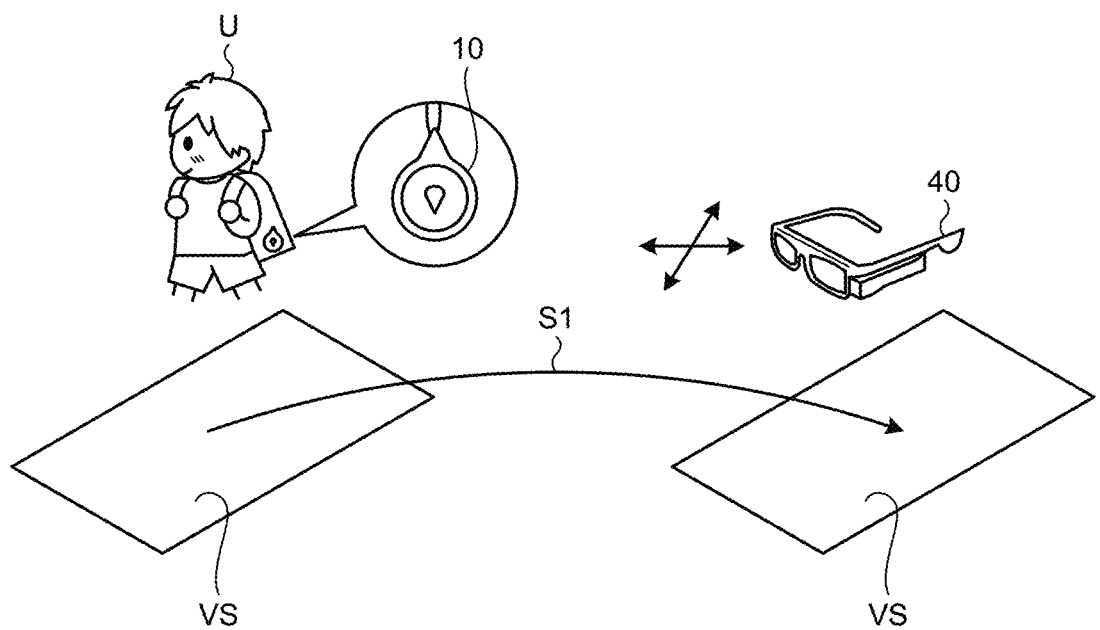
FIG. 4 is a diagram illustrating generation of a display image, in information processing according to an embodiment of the present disclosure.

FIG. 4 is a diagram illustrating generation of the display image, in information processing according to the embodiment of the present disclosure. The information processing according to the embodiment includes processing for acquiring a viewpoint image according to information indicating the position and direction of the mobile terminal 10, and processing for generating a 360-degree image reproducing the field of view of the child U who is the target to be monitored, on the basis of the acquired viewpoint image.

Furthermore, the information processing according to the embodiment includes processing S1 for generating, as the display image, a 360-degree image (free-viewpoint image) visible from a free viewpoint that can be freely moved on the 360-degree image. Here, the position and direction of the free viewpoint on a virtual space VS change according to the movement of the guardian wearing the display terminal 40.

Figure 5:
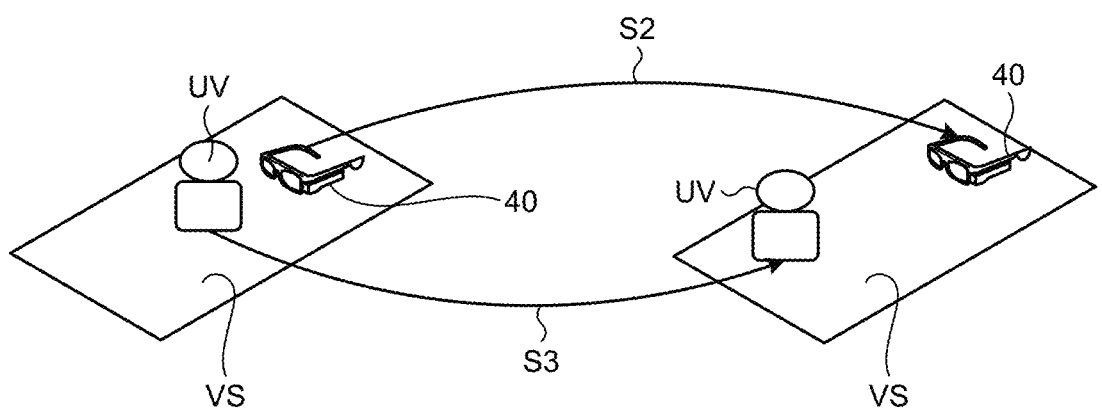
FIG. 5 is a diagram illustrating update of a display image with the movement of a target or of the position of free viewpoint, in information processing according to an embodiment of the present disclosure.

FIG. 5 is a diagram illustrating update of a display image with the movement of the target or of the position of the free viewpoint, in information processing according to the embodiment of the present disclosure. The information processing according to the embodiment includes processing S2 for updating the display image according to the movement of the free viewpoint. Processing S2 is processing that is performed when the movement of the free viewpoint is detected. Processing S2 includes processing for acquiring a viewpoint image, processing for generating a 360-degree image from the acquired viewpoint image, and processing S1 for generating a free-viewpoint image as the display image, which are described above with reference to FIG. 4. Furthermore, the information processing according to the embodiment includes processing S3 for updating the display image according to the movement of the child U.

Figure 6:
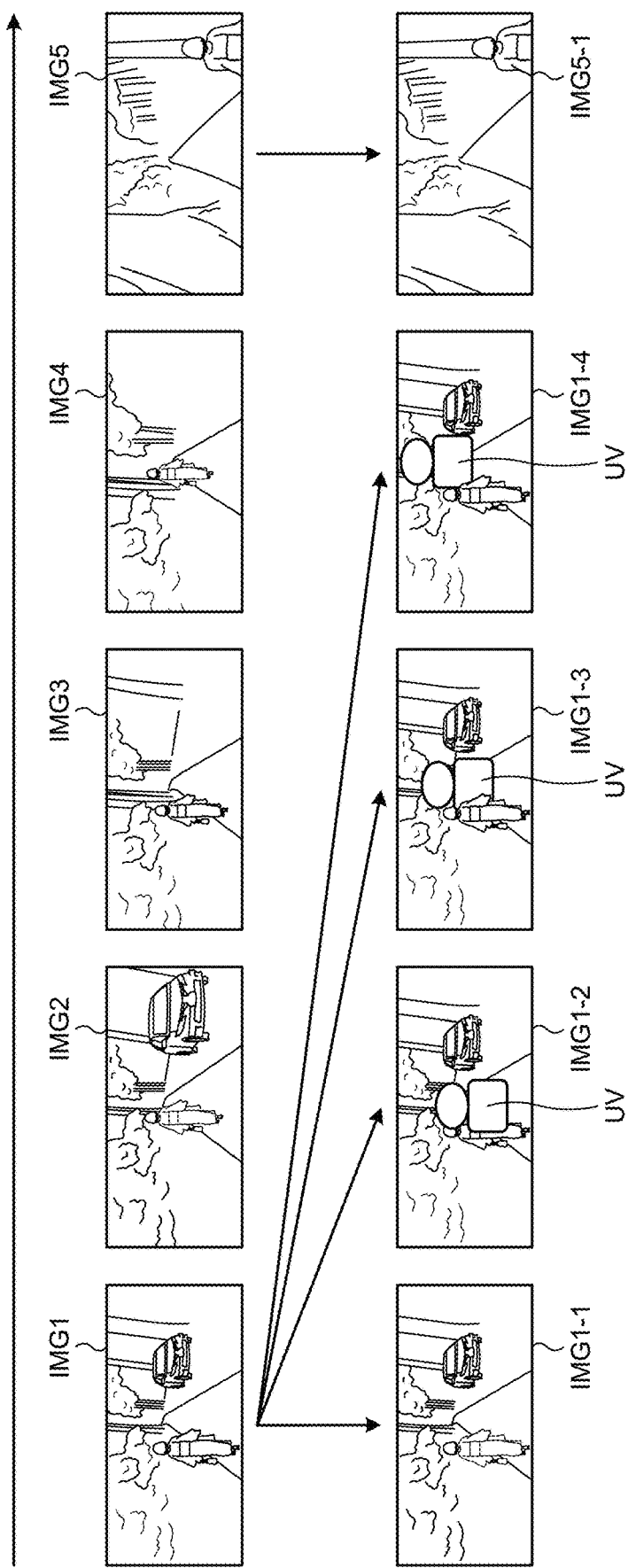
FIG. 6 is a diagram illustrating update of a viewpoint image according to an amount of movement of an object, in information processing according to an embodiment of the present disclosure.

FIG. 6 is a diagram illustrating update of the viewpoint image according to an amount of movement of the target, in the information processing according to the embodiment of the present disclosure. On the upper side of FIG. 6, viewpoint images IMG1, IMG2, IMG3, IMG4, and IMG5 are shown that correspond to the positions of the child U being the target who is moving in the direction of the field of view along a sidewalk.

In one example, in processing S3, viewpoint images are sequentially acquired according to the positions of the child U in response to the movement of the child U, and a free-viewpoint image is generated using the viewpoint images. However, when a viewpoint image is acquired from the street image server 20 every time the position of the child U changes, the amount of data transferred from the street image server 20 to the information processing device 30 becomes large, and the large amount of data has a possibility of causing a delay in interaction.

Therefore, in another example, in processing S3, the viewpoint image IMG1 according to the position of the child U is acquired, and a free-viewpoint image according to the position of the child U is generated by using the viewpoint image IMG1 until the amount of movement of the child U exceeds a predetermined threshold value. The predetermined threshold value can be set freely but to, for example, 30 m. On the lower side of FIG. 6, free-viewpoint images IMG1-1, IMG1-2, IMG1-3, and IMG1-4 are shown that are generated by using the viewpoint image IMG1. Specifically, in processing S3, an icon UV that indicates the position of the child U is superposed on the same viewpoint image IMG1 until the amount of movement of the child U exceeds the predetermined threshold value, and thereby, the free-viewpoint images IMG1-2, IMG1-3, and IMG1-4 are generated. In other words, in processing S3, until the amount of movement of the child U exceeds the predetermined threshold value, the icon UV is superimposed or the icon UV is moved on the same viewpoint image, instead of update of the viewpoint image, and this makes it possible to generate the respective free-viewpoint images according to the position of the child U. Meanwhile, in processing S3, when the amount of movement of the child U exceeds the predetermined threshold value, the viewpoint image IMG5 according to the position of the child U is acquired from the street image server 20, and the viewpoint image IMG5 is used to generate a free-viewpoint image IMG5-1. As described above, in processing S3, update frequency of the viewpoint image changes according to the amount of movement of the target. This makes it possible to suppress an increase in the amount of data transferred from the street image server 20 to the information processing device 30.

Figure 7:
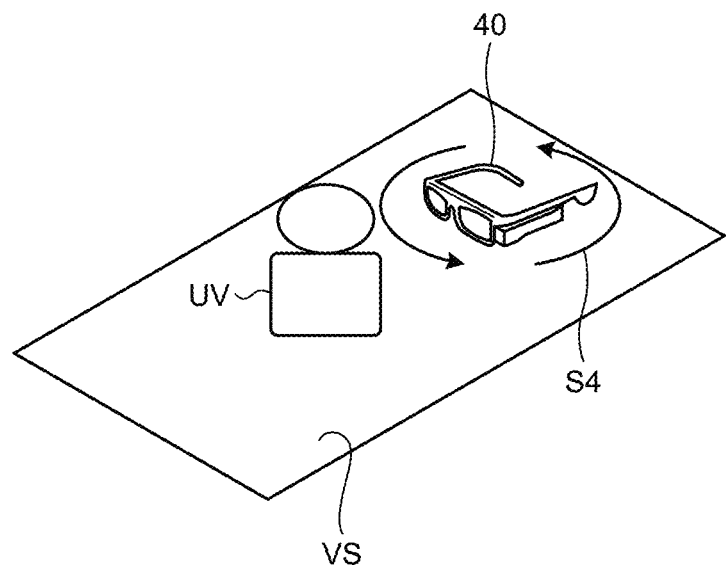
FIG. 7 is a diagram illustrating update of a display image in response to rotation at a free viewpoint, in information processing according to an embodiment of the present disclosure.

FIG. 7 is a diagram illustrating update of the display image in response to rotation at a free viewpoint, in the information processing according to the embodiment of the present disclosure. The information processing according to the embodiment includes processing S4 for updating the display image according to the rotation of the display terminal 40. Processing S4 is processing performed when the display terminal 40 rotates with no movement of the free viewpoint. In processing S4, a free-viewpoint image according to the rotation of the display terminal 40 is generated from an acquired viewpoint image without update of the viewpoint image.

[1-2-2. Update of Display Image According to Movement of Target Both Indoors and Outdoors]

Update of the display image according to the movement of the target both indoors and outdoors, in the information processing according to the embodiment will be described with reference to FIG. 8.

Figure 8:
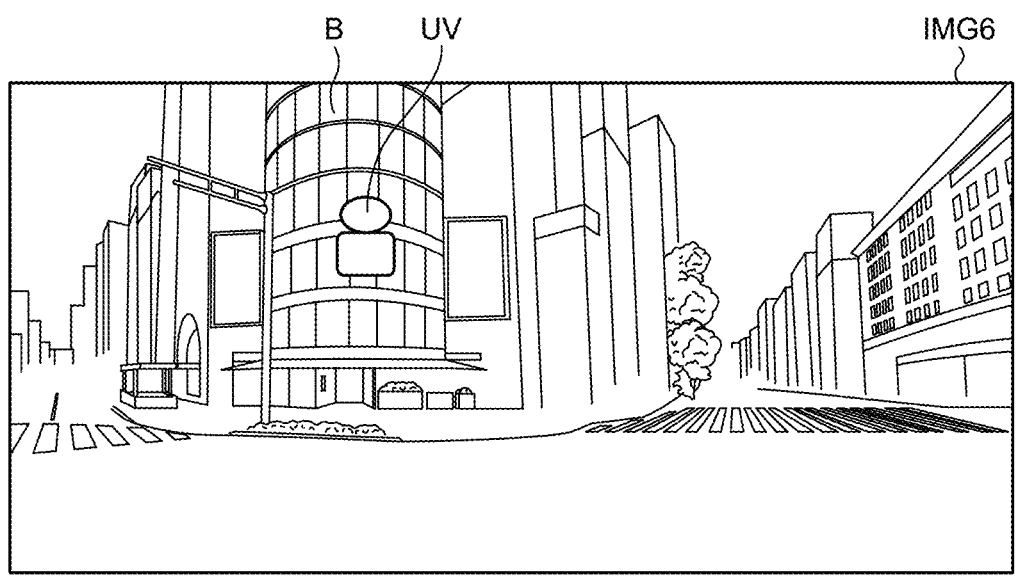
FIG. 8 is a diagram illustrating update of a display image according to movement indoors and outdoors, in information processing according to an embodiment of the present disclosure.

FIG. 8 is a diagram illustrating the update of the display image according to movement indoors and outdoors, in the information processing according to the embodiment of the present disclosure. In some cases, the child U enters and leaves a building B, that is, moves outdoors or moves indoors. In the information processing according to the embodiment, when the street image server 20 stores a viewpoint image of the inside of the building B, a free-viewpoint image as the display image is generated on the basis of indoor position information as described above. On the other hand, the street image server 20 may store no viewpoint image of the inside of the building B. In this case, in the information processing according to the embodiment, a free-viewpoint image IMG6 as the display image is generated on the basis of a viewpoint image that includes the building B captured from any position outside the building B, as illustrated in FIG. 8. Specifically, in the information processing according to the embodiment, the free-viewpoint image IMG6 that expresses the child U being in the building B is generated by superimposing the icon UV indicating the child U on the position of the building B. The viewpoint image including the building B can employ, for example, a viewpoint image acquired immediately before the child U enters the building B.

Note that It is preferable to express the child U being inside the building B. For example, it is possible that the area of the building B in the viewpoint image is made transparent and then the icon UV is allowed to be placed in the area.

Note that the position of the icon UV superimposed on the viewpoint image may be moved on the basis of the indoor position information of the child U. For example, the position on which the icon UV is superimposed is moved in a height direction of the building B, according to the movement of the child U between floors in the building. Furthermore, the viewpoint image on which the icon UV is to be superimposed may be updated on the basis of the indoor position information of the child U.

[1-2-3. Generation of Display Image without Using Viewpoint Image]

Generation of a display image without using a viewpoint image in the information processing according to the embodiment will be described with reference to FIG. 9.

Figure 9:
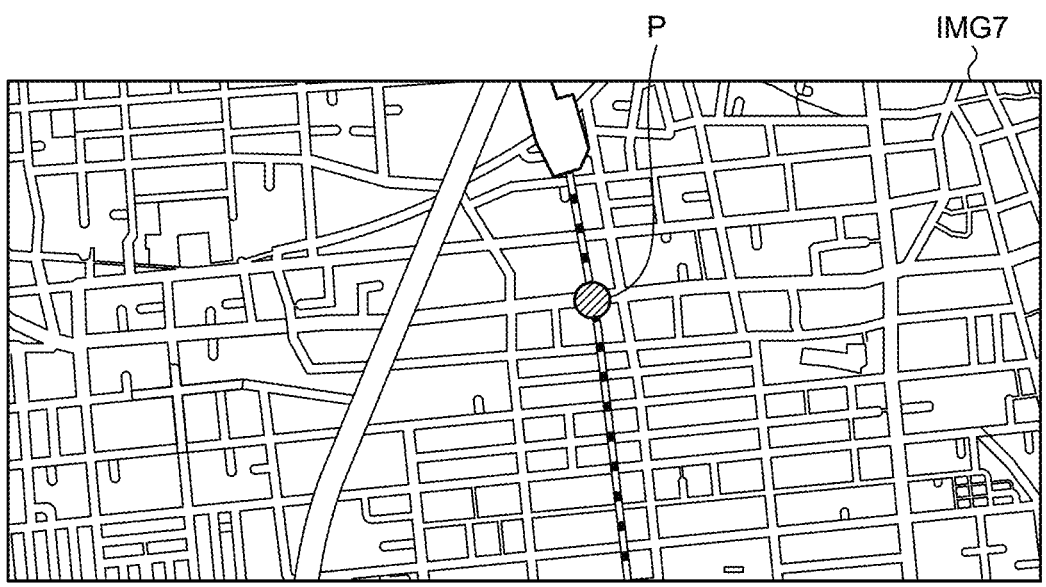
FIG. 9 is a diagram illustrating generation of a display image without using viewpoint image data, in information processing according to an embodiment of the present disclosure.

FIG. 9 is a diagram illustrating generation of a display image without using a viewpoint image, in the information processing according to the embodiment of the present disclosure. In some cases, the child U travels by vehicle (mobile object) such as train, bus, or bicycle. In such a case, the frequency of acquiring a viewpoint image from the street image server 20 increases in response to the travel of the child U, and there is a possibility that the interaction may be delayed. Furthermore, viewpoint images stored in the street image server 20 cannot express the field of view of the child U in the train. Therefore, in the information processing according to the embodiment, when it is detected that the child U is traveling by vehicle such as train or bus, a display image IMG7 is generated by using a map without using the viewpoint image, as illustrated in FIG. 9. At this time, the position of the child U is preferably represented by a marker P or the like, as illustrated in FIG. 9. Note that a travel mode of the child U can be detected by, for example, activity recognition based on the position information or the like.

Note that the street image server 20 may store no viewpoint image, depending on the position of the child U. In this case as well, the display image can be generated using the map, as described above.

[1-3. Information Processing Procedure According to Embodiment]

Next, a procedure of the information processing according to the embodiment will be described with reference to FIG. 10.

Figure 10:
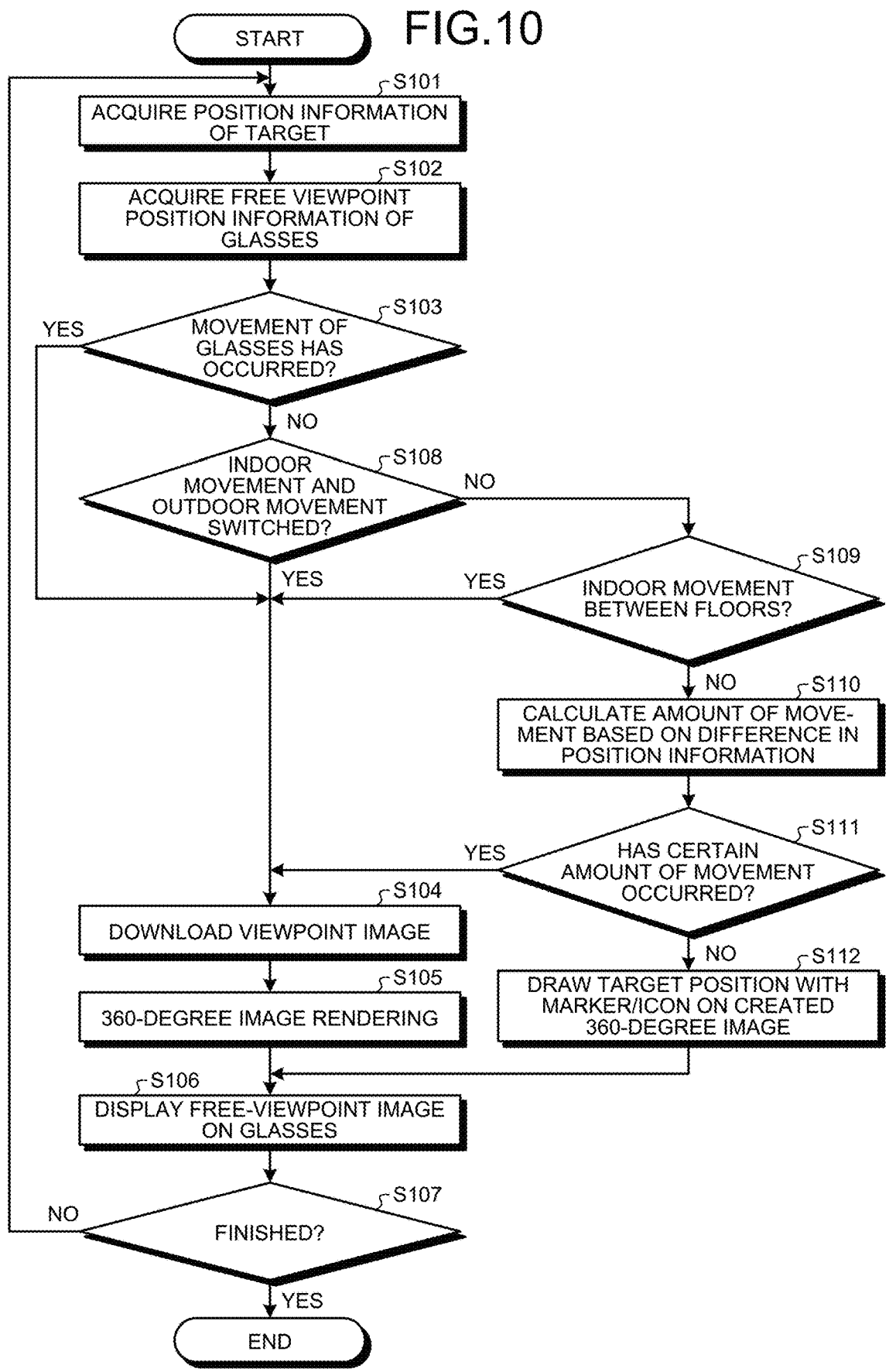
FIG. 10 is a flowchart illustrating an example of information processing according to an embodiment of the present disclosure.

FIG. 10 is a flowchart illustrating an example of the information processing according to the embodiment of the present disclosure.

The communication unit 31 acquires information (position information) indicating the position of the child U being the target to be monitored from the mobile terminal 10 (S101). Furthermore, the communication unit 31 acquires, from the display terminal 40, information (free viewpoint position information) indicating the position of the free viewpoint specified by the display terminal 40 being an AR glasses (HMD) (S102).

The position information update management unit 32 determines whether the position of the free viewpoint has moved, that is, whether the movement of the AR glasses has occurred (S103).

<Update of Display Image According to Movement of Free Viewpoint>

If the movement of the AR glasses has occurred (S103: Yes), the position information update management unit 32 generates a viewpoint image request on the basis of the free viewpoint position information after the movement of the AR glasses and outputs the viewpoint image request to the communication unit 31. Here, the occurrence of movement of the AR glasses means that the position of the free viewpoint has 6DoF movement. The communication unit 31 transmits the viewpoint image request to the street image server 20 and receives a viewpoint image according to the viewpoint image request from the street image server 20 (S104). The 360-degree image rendering unit 33 performs rendering processing to generate a 360-degree image for display, on the basis of the viewpoint image from the street image server 20 (S105). The 360-degree image rendering unit 33 outputs a generated 360-degree image for display to the free-viewpoint image rendering unit 34. The free-viewpoint image rendering unit 34 performs rendering processing to generate a rendering image rendered from the free viewpoint according to the field of view of the display terminal 40, on the basis of a 360-degree image generated by the 360-degree image rendering unit 33 and specification of the free viewpoint from the display terminal 40. Furthermore, the free-viewpoint image rendering unit 34 outputs a generated free-viewpoint image to the display terminal 40 via the communication unit 31. Furthermore, the display terminal 40 displays the generated free-viewpoint image (S106). Then, the position information update management unit 32 determines whether to finish the information processing (S107). If it is determined that the information processing is not finished (S107: No), the process of FIG. 10 returns to the processing of S101. On the other hand, when it is determined that the information processing is finished (S107: Yes), the process of FIG. 10 is finished.

<Update of Display Image According to Movement of Target Both Indoors and Outdoors>

If no movement of the AR glasses has occurred (S103: No), the position detection unit 131 determines whether the target has moved indoors or outdoors, that is, whether indoor movement and outdoor movement are switched (S108). Here, occurrence of no movement of the AR glasses means that the position of the free viewpoint has no movement or has 3DoF movement.

If the indoor movement and the outdoor movement are switched (S108: Yes), the process of FIG. 10 proceeds to the processing of S104. In other words, when no movement of the AR glasses has occurred, the display image is updated as described above.

If the indoor movement and the outdoor movement are not switched (S108: No), the position detection unit 131 determines whether indoor movement is performed between floors (S109).

If the indoor movement is performed between floors (S109: Yes), the process of FIG. 10 proceeds to the processing of S104. In other words, when the indoor movement is performed between floors, the display image is updated as described above.

<Update of Display Image According to Movement of Target>

If the indoor movement is not performed between floors (S109: No), the position information update management unit 32 calculates the amount of movement of the target on the basis of a difference in the position information (S110). Then, the position information update management unit 32 determines whether a certain amount of movement of the target has occurred, on the basis of the calculated amount of movement (S111).

If the certain amount of movement of the target has occurred (S111: Yes), the process of FIG. 10 proceeds to the processing of S104. In other words, when the amount of movement that exceeds a threshold value for viewpoint switching is generated, the display image is updated as described above.

If the certain amount of movement of the target has not occurred (S111: No), the 360-degree image rendering unit 33 superimposes a marker or icon on a created 360-degree image to generate a 360-degree image in which the position of the target is drawn (S112). Then, the process of FIG. 10 proceeds to S106. In other words, when the amount of movement of the target is within a certain range, the display image is updated without receiving a viewpoint image from the street image server 20.

[1-4. Use Examples of Information Processing System According to Embodiment]

Here, a use example of the information processing system 1 according to an embodiment will be described with reference to FIG. 11.

Figure 11:
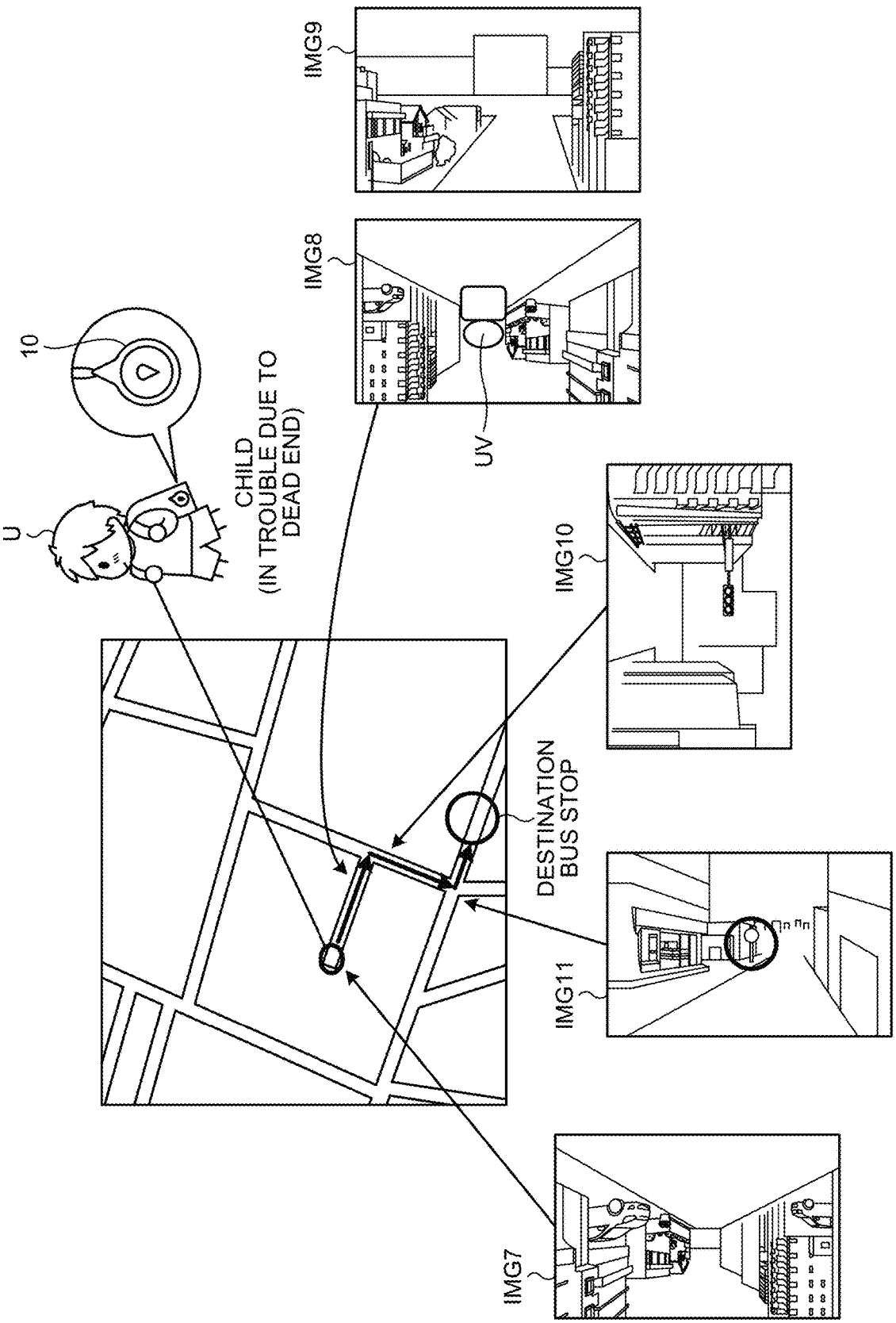
FIG. 11 is a diagram illustrating a usage example of an information processing system according to an embodiment of the present disclosure.

FIG. 11 is a diagram illustrating a usage example of the information processing system 1 according to an embodiment of the present disclosure. In the example illustrated in FIG. 11, the orientation of the display image corresponds to the orientation of the guardian wearing the AR glasses (the display terminal 40). For example, a display image facing left represents an image displayed on the display terminal 40 when the guardian turns to the left. For example, a display image facing downward represents an image displayed on the display terminal 40 when the guardian looks back. It is assumed that when the guardian in a stationary state is looking at the field of view of the child U who is moving with the mobile terminal 10, for example, the child U is in trouble due to a dead end.

Firstly, a display image IMG7 (360-degree image) showing around the position of the child U is displayed on the display terminal 40. In the display image IMG7, for example, the direction of the child U has an initial state. This facilitates the guardian grasping a situation that, for example, the child U is in trouble due to the dead end. Then, the guardian starts 6DoF movement with the display terminal 40 mounted. At this time, the display image is updated with the movement of the position of the free viewpoint. A display image IMG8 is a display image showing the direction of the dead end, where the guardian's free viewpoint is moved to the opposite side from the dead end and in such a state the guardian faces to the left to view the direction of the dead end. In this way, the icon UV indicating the position of the child U may be displayed in a superimposed manner, on the basis of the position information of the child U. This makes it possible that, upon virtual movement, the guardian readily understands a relative positional relationship with the child U. In addition, a display image IMG9 that is displayed when the guardian faces to the right shows the opposite side from the dead end, and thereby, a route for the child U to get out of the dead end can be searched for. On the basis of the display image IMG9, the guardian can guide the child U along a specific route, for example, "Come to the point where you can see the green house on the left and turn to the right." Then, the guardian can further guide the child U along a specific route, for example, "Go left on the next road", on the basis of a display image IMG10 updated with the movement of the position of the free viewpoint. In this way, the guardian is allowed to confirm a bus stop owing to a display image IMG11 updated with the movement of the free viewpoint, without the movement of the child U.

Note that the embodiment exemplifies, but is not limited to, the monitoring service for monitoring the child U by the guardian. The target of the monitoring service according to the present disclosure may be, for example, an elderly person. Furthermore, the technology according to the present disclosure is not limited to the monitoring service but can be achieved as a route guidance service for delivery service drivers, tourists, and the like.

[1-5. Hardware Configuration)

Figure 12:
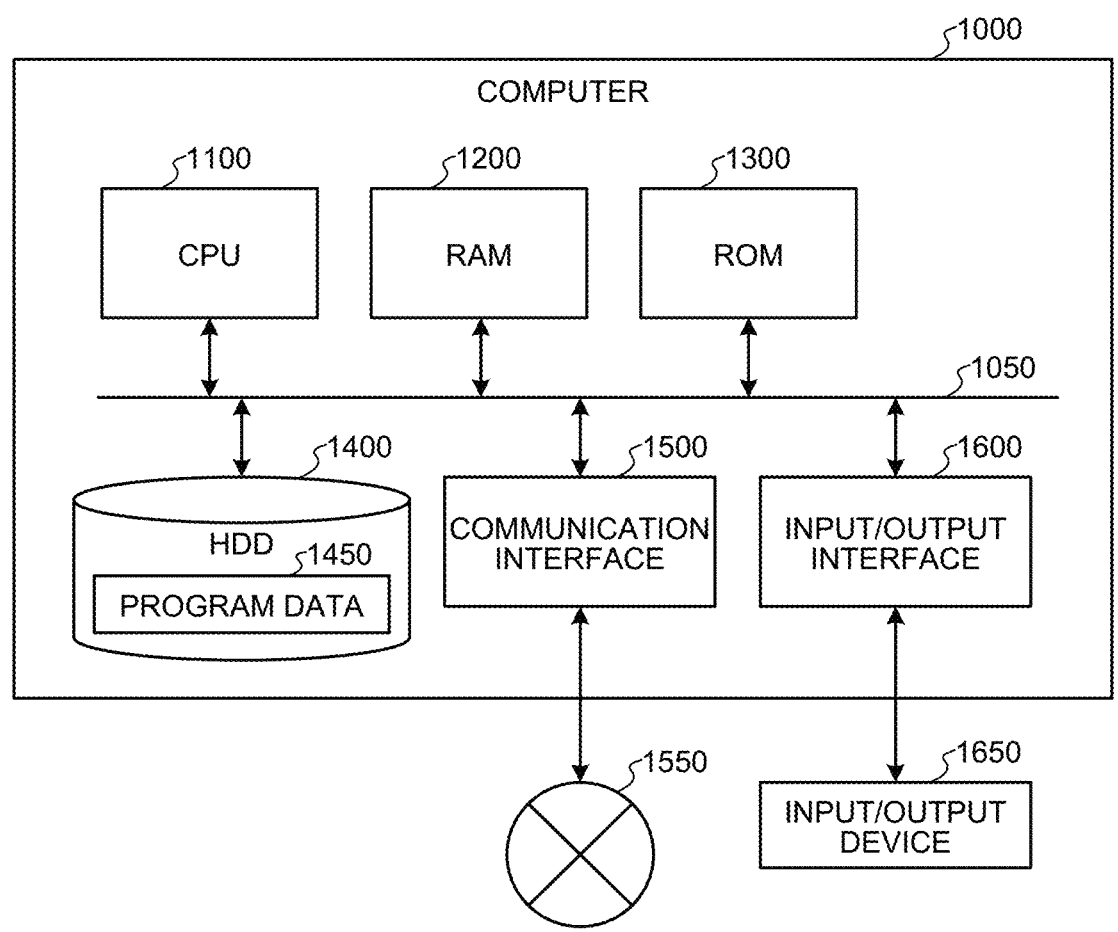
FIG. 12 is a block diagram illustrating an example of a hardware configuration of each device of an information processing system according to an embodiment of the present disclosure.

FIG. 12 is a block diagram illustrating an example of a hardware configuration of each device of the information processing system 1 according to an embodiment of the present disclosure. Information devices such as the respective devices (the mobile terminal 10, the information processing device 30, and the display terminal 40) of the information processing system 1 according to the embodiments described above are achieved by, for example, a computer 1000 having a configuration as illustrated in FIG. 12.

The computer 1000 includes a CPU 1100, a RAM 1200, a read only memory (ROM) 1300, a hard disk drive (HDD) 1400, a communication interface 1500, and an input/output interface 1600. The respective component units of the computer 1000 are communicably connected by a bus 1050.

The CPU 1100 operates on the basis of a program stored in the ROM 1300 or HDD 1400 and controls the respective component units. For example, the CPU 1100 loads a program stored in the ROM 1300 or HDD 1400 into the RAM 1200 to execute processing (information processing according to the present disclosure) corresponding to various programs.

The ROM 1300 stores a boot program such as a basic input output system (BIOS) that is executed by the CPU 1100 upon booting the computer 1000, and a program that depends on the hardware of the computer 1000.

The HDD 1400 is a computer-readable recording medium that non-transitorily records a program executed by the CPU 1100, data used by the program, and the like.

The communication interface 1500 is an interface configured to connect the computer 1000 to the network N and an external network 1550 (e.g., the Internet). For example, the CPU 1100 receives data from another device or transmits data generated by the CPU 1100 to another device, via the communication interface 1500.

The input/output interface 1600 is an interface configured to connect an input/output device 1650 to the computer 1000. For example, the CPU 1100 receives data from an input device such as a keyboard or mouse, via the input/output interface 1600. Furthermore, the CPU 1100 transmits data to an output device such as a display, speaker, or printer, via the input/output interface 1600. Furthermore, the input/output interface 1600 may function as a media interface configured to read a program or the like recorded on a predetermined recording medium. The medium includes, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, the CPU 1100 of the computer 1000 executes a program loaded into the RAM 1200 to achieve each function of each device. Note that the CPU 1100 reads program data 1450 from the HDD 1400 to execute the program data 1450, but in another example, these programs may be acquired from another device via the external network 1550.

2. Effects of Information Processing System According to Present Disclosure

The information processing device 30 includes the acquisition unit (the communication unit 31, the position information update management unit 32), the generation unit (the 360-degree image rendering unit 33, the free-viewpoint image rendering unit 34), and the output unit (the communication unit 31). The acquisition unit acquires a viewpoint image according to the viewpoint of the first user, from the street image server 20 configured to store a plurality of viewpoint images obtained by capturing images from a plurality of orientations in each of a plurality of positions, on the basis of position information indicating the position of the mobile terminal 10 moving with the first user. The generation unit uses the acquired viewpoint image to generate a rendering image rendered from the free viewpoint specified by the second user who is located at a position different from that of the first user as a display image. The output unit outputs the generated display image.

This configuration makes it possible that the information processing device 30 reduces the amount of data transferred from the mobile terminal 10 to the display terminal 40, even when the field of view of the first user of the mobile terminal 10 is displayed on the display terminal 40 used by the second user. Therefore, the information processing device 30 is allowed to display the field of view of the first user of the mobile terminal 10, visible from the free viewpoint, is displayed on the display terminal 40 used by the second user located at a different position, with the movement of the first user, and thus, the second user can reduce the amount of data transferred while readily grasping the situation of the first user, suppressing the delay of the interaction. In addition, capturing a 360-degree image involves complicated operations by the first user who is the target to be monitored, in some cases. However, the information processing device 30 makes it possible to eliminate the need for the operation to capture the 360-degree image by using the mobile terminal 10 by the first user who is the target to be monitored. Furthermore, the display image output from the information processing device 30 is generated on the basis of a viewpoint image acquired from the street image server 20 prepared in advance. Therefore, according to the information processing device 30, use of a viewpoint image on which image processing such as blurring is performed in advance for an object unintendedly captured, which is an unexpected object within an angle of view reduces security risk caused by the object unintendedly captured.

In the information processing device 30, the acquisition unit acquires a viewpoint image when the amount of movement of the mobile terminal 10 exceeds a predetermined threshold value.

Therefore, the information processing device 30 is allowed to reduce the frequency of updating the viewpoint image.

In the information processing device 30, the acquisition unit acquires no viewpoint image when a change in position of the mobile terminal 10 is equal to or less than a predetermined threshold value. Furthermore, in the information processing device 30, the generation unit superimposes the icon or marker indicating the position of the first user, on the acquired viewpoint image and generates a display image.

Therefore, the information processing device 30 is allowed to express the position of the first user, in the display image, even when the viewpoint image is not updated.

In the information processing device 30, the acquisition unit acquires a viewpoint image, when the free viewpoint is moved by the second user.

Therefore, the information processing device 30 is allowed to update the viewpoint image when the free viewpoint moves.

In the information processing device 30, the acquisition unit acquires a viewpoint image when the position of the mobile terminal 10 is changed between an indoor position and an outdoor position.

Therefore, the information processing device 30 is allowed to update the viewpoint image when the position of the mobile terminal 10 is switched between the indoor position and the outdoor position.

In the information processing device 30, the generation unit generates a display image by superimposing an icon or marker indicating the position of the first user, on the viewpoint image acquired before the position of the mobile terminal is switched from the outdoor position to the indoor position, when there is not the viewpoint image of the indoor position of a place in which the mobile terminal 10 is located.

Therefore, the information processing device 30 is allowed to express the position of the first user in the display image even when the first user enters a building for which no viewpoint image is prepared in the street image server 20.

In the information processing device 30, the acquisition unit acquires a viewpoint image when the mobile terminal 10 is positioned indoors and moves between floors.

Therefore, the information processing device 30 is allowed to generate a display image using an appropriate viewpoint image even when the first user is indoors.

In the information processing device 30, when the travel of the first user by mobile object (vehicle) is detected, the generation unit generates a display image by superimposing the icon or marker indicating the position of the first user on a map.

Therefore, the information processing device 30 is allowed to express the position of the first user in the display image even in a situation where no viewpoint image is prepared therefor in the street image server 20. Furthermore, the information processing device 30 is allowed to suppress unnecessary update even when the display image is configured to be updated according to the amount of movement.

The information processing system 1 includes the mobile terminal 10, the street image server 20, the information processing device 30, and the display terminal 40. The mobile terminal 10 moves with the first user and outputs position information. The street image server 20 stores viewpoint images. The display terminal 40 moves together with the second user and displays the display image.

Therefore, the information processing system 1 is allowed to suppress a delay in interaction when displaying the field of view of the first user of the mobile terminal 10, on the display terminal 40 used by the second user located at a different position. In addition, this makes it possible to eliminate the need for the operation to capture a 360-degree image by using the mobile terminal 10 by the first user being the target to be monitored. Furthermore, it is possible to reduce the security risk caused by an object unintendedly captured.

In the information processing system 1, the display terminal 40 is a head-mounted display that is configured to be mounted on the head of the second user.

Therefore, the information processing system 1 is allowed to specify the free viewpoint without any special operation by the second user wearing the display terminal 40.

The information processing method includes acquiring a viewpoint image according to the viewpoint of the first user, from the street image server 20 configured to store a plurality of viewpoint images obtained by capturing images from a plurality of orientations in each of a plurality of positions, on the basis of position information indicating the position of the mobile terminal 10 moving with the first user, generating as a display image a rendering image rendered from the free viewpoint specified by the second user who is located at a position different from that of the first user, by using the acquired viewpoint image, and outputting the generated display image.

Therefore, the information processing method is allowed to suppress a delay in interaction when displaying the field of view of the first user of the mobile terminal 10, on the display terminal 40 used by the second user located at a different position. In addition, this makes it possible to eliminate the need for the operation to capture a 360-degree image by using the mobile terminal 10 by the first user being the target to be monitored. Furthermore, it is possible to reduce the security risk caused by an object unintendedly captured.

The information processing method further includes acquiring a viewpoint image when the amount of movement of the mobile terminal 10 exceeds a predetermined threshold value.

Therefore, the information processing method is allowed to reduce the frequency of updating the viewpoint image.

The information processing method further includes generating a display image by superimposing an icon or marker indicating the position of the first user on the acquired viewpoint image, without acquiring a viewpoint image when a change in position of the mobile terminal 10 is equal to or lower than a predetermined threshold value.

Therefore, the information processing method is allowed to express the position of the first user in the display image even when the viewpoint image is not updated.

The information processing method further includes acquiring a viewpoint image, when the free viewpoint is moved by the second user.

Therefore, the information processing method is allowed to update the viewpoint image when the free viewpoint moves.

The information processing method further includes acquiring a viewpoint image when the position of the mobile terminal 10 is changed between an indoor position and an outdoor position.

Therefore, the information processing method is allowed to update the viewpoint image when the position of the mobile terminal 10 is switched between the indoor position and the outdoor position.

The information processing method further includes generating a display image by superimposing an icon or marker indicating the position of the first user, on the viewpoint image acquired before the position of the mobile terminal is switched from the outdoor position to the indoor position, when there is no indoor viewpoint image of a place in which the mobile terminal 10 is located.

Therefore, the information processing method is allowed to express the position of the first user in the display image even when the first user enters a building for which no viewpoint image is prepared in the street image server 20.

The program causes a computer to perform acquiring a viewpoint image according to the viewpoint of the first user, from the street image server 20 configured to store a plurality of viewpoint images obtained by capturing images from a plurality of orientations in each of a plurality of positions, on the basis of position information indicating the position of the mobile terminal 10 moving with the first user, generating as a display image a rendering image rendered from the free viewpoint specified by the second user who is located at a position different from that of the first user, by using the acquired viewpoint image, and outputting the generated display image.

Therefore, the program is allowed to suppress a delay in interaction when displaying the field of view of the first user of the mobile terminal 10, on the display terminal 40 used by the second user located at a different position. In addition, this makes it possible to eliminate the need for the operation to capture a 360-degree image by using the mobile terminal 10 by the first user being the target to be monitored. Furthermore, it is possible to reduce the security risk caused by an object unintendedly captured.

The program further causes a computer to perform acquiring a viewpoint image when the amount of movement of the mobile terminal 10 exceeds a predetermined threshold value.

Thus, the program is allowed to reduce the frequency of updating the viewpoint image.

The program further causes a computer to perform generating a display image by superimposing an icon or marker indicating the position of the first user on the acquired viewpoint image, without acquiring a viewpoint image when a change in position of the mobile terminal 10 is equal to or lower than a predetermined threshold value.

Therefore, the program is allowed to express the position of the first user, in the display image, even when the viewpoint image is not updated.

The program further causes a computer to acquire a viewpoint image, when the free viewpoint is moved by the second user.

Therefore, the program is allowed to update the viewpoint image when the free viewpoint moves.

The program further causes a computer to acquire a viewpoint image when the position of the mobile terminal 10 is changed between an indoor position and an outdoor position.

Therefore, the program is allowed to update the viewpoint image when the position of the mobile terminal 10 is switched between the indoor position and the outdoor position.

The program further causes a computer to perform generating a display image by superimposing an icon or marker indicating the position of the first user, on the viewpoint image acquired before the position of the mobile terminal is switched from the outdoor position to the indoor position, when there is no indoor viewpoint image of a place in which the mobile terminal 10 is located.

Therefore, the program is allowed to express the position of the first user in the display image even when the first user enters a building for which no viewpoint image is prepared in the street image server 20.

Note that the effects described herein are merely examples, the present invention is not limited to these effects, and other effects may also be provided.

Note that the present technology may also have the following configurations.

(1)
An information processing device comprising:
an acquisition unit configured to acquire a viewpoint image according to a viewpoint of a first user, from an image server configured to store a plurality of viewpoint images obtained by capturing images from a plurality of orientations in each of a plurality of positions, based on position information indicating a position of a mobile terminal moving with the first user;
a generation unit configured to use the acquired viewpoint image to generate a rendering image rendered from a free viewpoint specified by a second user who is located at a position different from that of the first user, as a display image; and
an output unit configured to output the generated display image.

(2)
The information processing device according to (1), wherein the acquisition unit acquires the viewpoint image when an amount of movement of the mobile terminal exceeds a predetermined threshold value.

(3)
The information processing device according to (1) or (2), wherein
the acquisition unit does not acquire the viewpoint image when a change in position of the mobile terminal is equal to or lower than a predetermined threshold value, and
the generation unit superimposes an icon or marker indicating a position of the first user, on the acquired viewpoint image and generates the display image.

(4)
The information processing device according to any one of (1) to (3), wherein the acquisition unit acquires the viewpoint image when the free viewpoint is moved by the second user.

(5)
The information processing device according to any one of (1) to (4), wherein the acquisition unit acquires the viewpoint image when the position of the mobile terminal is changed between an indoor position and an outdoor position.

(6)
The information processing device according to (5), wherein the generation unit generates the display image by superimposing the icon or marker indicating a position of the first user on the viewpoint image acquired before the position of the mobile terminal is switched from an outdoor position to an indoor position, when there is not the viewpoint image of the indoor position at which the mobile terminal is located.

(7)
The information processing device according to any one of (1) to (6), wherein the acquisition unit acquires the viewpoint image when the mobile terminal is positioned indoors and moves between floors.

(8)
The information processing device according to any one of (1) to (7), wherein the generation unit generates the display image by superimposing the icon or marker indicating a position of the first user on a map, when the travel of the first user by mobile object is detected.

(9)
An information processing system including:
the mobile terminal that moves with the first user and is configured to output the position information,
the image server configured to store the viewpoint image,
the display terminal that moves with the second user and is configured to display the display image, and
the information processing device according to any of (1) to (8).

(10)
The information processing system according to (9), wherein the display terminal is a head-mounted display that is mounted on the head of the second user.

(11)
An information processing method comprising:
acquiring a viewpoint image according to a viewpoint of a first user, from an image server configured to store a plurality of viewpoint images obtained by capturing images from a plurality of orientations in each of a plurality of positions, based on position information indicating a position of a mobile terminal moving with the first user;
generating as a display image a rendering image rendered from a free viewpoint specified by a second user who is located at a position different from that of the first user, by using the acquired viewpoint image; and
outputting the generated display image.

The information processing method according to claim 9, further comprising acquiring the viewpoint image when an amount of movement of the mobile terminal exceeds a predetermined threshold value.

(12)

The information processing method according to (11), further comprising acquiring the viewpoint image when an amount of movement of the mobile terminal exceeds a predetermined threshold value.

(13)

The information processing method according to (11) or (12), further comprising generating the display image by superimposing an icon or marker indicating a position of the first user on the acquired viewpoint image, without acquiring the viewpoint image when a change in position of the mobile terminal is equal to or lower than a predetermined threshold value.

(14)

The information processing method according to any one of (11) to (13), further comprising acquiring the viewpoint image when the free viewpoint is moved by the second user.

(15)

The information processing method according to any one of (11) to (14), further comprising acquiring the viewpoint image when the position of the mobile terminal is changed between an indoor position and an outdoor position.

(16)

The information processing method according to (15), further comprising generating the display image by superimposing the icon or marker indicating a position of the first user on the viewpoint image acquired before the position of the mobile terminal is switched from an outdoor position to an indoor position, when there is not the viewpoint image of the indoor position at which the mobile terminal is located.

(17)

A program causing a computer to perform:
- acquiring a viewpoint image according to a viewpoint of a first user, from an image server configured to store a plurality of viewpoint images obtained by capturing images from a plurality of orientations in each of a plurality of positions, based on position information indicating a position of a mobile terminal moving with the first user;
- generating as a display image a rendering image rendered from a free viewpoint specified by a second user who is located at a position different from that of the first user, by using the acquired viewpoint image; and
- outputting the generated display image.

(18)

The program according to (17) further causing a computer to perform acquiring the viewpoint image when an amount of movement of the mobile terminal exceeds a predetermined threshold value.

(19)

The program according to (17) or (18) further causing a computer to perform generating the display image by superimposing an icon or marker indicating a position of the first user on the acquired viewpoint image, without acquiring the viewpoint image when a change in position of the mobile terminal is equal to or lower than a predetermined threshold value.

(20)

The program according to any one of (17) to (19) further causing a computer to perform acquiring the viewpoint image when the free viewpoint is moved by the second user.

(21)

The program according to any one of (17) to (20) further causing a computer to perform acquiring the viewpoint image when the position of the mobile terminal is changed between an indoor position and an outdoor position.

(22)

The program according to (21) further causing a computer to perform generating the display image by superimposing the icon or marker indicating a position of the first user on the viewpoint image acquired before the position of the mobile terminal is switched from an outdoor position to an indoor position, when there is not the viewpoint image of the indoor position at which the mobile terminal is located.

REFERENCE SIGNS LIST

1 INFORMATION PROCESSING SYSTEM
10 MOBILE TERMINAL
11 COMMUNICATION UNIT
111 CELLULAR MODULE
112 Wi-Fi MODULE
113 BLE MODULE
12 SENSOR UNIT
121 GPS SENSOR
122 GEOMAGNETIC SENSOR
123 IMU
13 DETECTION UNIT
131 POSITION DETECTION UNIT
132 OUTDOOR POSITION DETECTION UNIT
133 INDOOR POSITION DETECTION UNIT
134 DIRECTION DETECTION UNIT
135 MOTION DETECTION UNIT
14 INPUT/OUTPUT UNIT
20 STREET IMAGE SERVER
30 INFORMATION PROCESSING DEVICE
31 COMMUNICATION UNIT (ACQUISITION UNIT, OUTPUT UNIT)
32 POSITION INFORMATION UPDATE MANAGEMENT UNIT (ACQUISITION UNIT)
33 360-DEGREE IMAGE RENDERING UNIT (GENERATION UNIT)
34 FREE-VIEWPOINT IMAGE RENDERING UNIT (GENERATION UNIT)
40 DISPLAY TERMINAL
41 COMMUNICATION UNIT
42 IMU
43 CAMERA
44 INPUT/OUTPUT UNIT
441 LIGHT GUIDE LENS
N NETWORK

The invention claimed is:

1. An information processing device comprising:
circuitry configured to
  acquire, from an image server, a first viewpoint image according to a direction and position of a mobile terminal associated with a first user, the image server storing a plurality of previously-captured viewpoint images obtained by capturing images from a plurality of directions in each of a plurality of positions;
  generate, as a display image, a rendering image rendered from a free viewpoint based on the first viewpoint image and a specification of the free viewpoint by a second user who is located at a position different from that of the first user; and
  output the generated display image.

2. The information processing device according to claim 1, wherein the circuitry acquires the first viewpoint image when an amount of movement of the mobile terminal exceeds a predetermined threshold value.

3. The information processing device according to claim 1, wherein the circuitry does not acquire the first viewpoint image when a change in the position of the mobile terminal is equal to or lower than a predetermined threshold value, and the circuitry superimposes an icon or marker indicating a position of the first user on the currently displayed display image.

4. The information processing device according to claim 1, wherein the circuitry acquires the first viewpoint image when the free viewpoint specified by the second user is moved by the second user.

5. The information processing device according to claim 1, wherein the circuitry acquires the first viewpoint image when the position of the mobile terminal is changed between an indoor position and an outdoor position.

6. The information processing device according to claim 5, wherein the circuitry generates the display image by superimposing an icon or marker indicating a position of the first user on a second viewpoint image acquired from the image server before the position of the mobile terminal changes from an outdoor position to an indoor position, when there is no viewpoint image available of the indoor position at which the mobile terminal is located.

7. The information processing device according to claim 1, wherein the circuitry acquires the first viewpoint image when the mobile terminal is positioned indoors and moves from a first floor to a second floor.

8. The information processing device according to claim 1, wherein the circuitry generates the display image by superimposing an icon or marker indicating a position of the first user on a map, when travel of the first user by mobile object is detected.

9. An information processing method comprising:
acquiring, with circuitry and from an image server, a first viewpoint image according to a direction and position of a mobile terminal associated with a first user, the image storing a plurality of previously-captured viewpoint images obtained by capturing images from a plurality of directions in each of a plurality of positions;
generating, as a display image, a rendering image rendered from a free viewpoint based on the first viewpoint image and a specification of the free viewpoint by a second user who is located at a position different from that of the first user; and
outputting the generated display image.

10. The information processing method according to claim 9, further comprising acquiring the first viewpoint image when an amount of movement of the mobile terminal exceeds a predetermined threshold value.

11. The information processing method according to claim 9, further comprising generating the display image by superimposing an icon or marker indicating a position of the first user on a currently displayed display image, without acquiring the first viewpoint image, when a change in position of the mobile terminal is equal to or lower than a predetermined threshold value.

12. The information processing method according to claim 9, further comprising acquiring the first viewpoint image when the free viewpoint specified by the second user is moved by the second user.

13. The information processing method according to claim 9, further comprising acquiring the first viewpoint image when the position of the mobile terminal is changed between an indoor position and an outdoor position.

14. The information processing method according to claim 13, further comprising generating the display image by superimposing an icon or marker indicating a position of the first user on a second viewpoint image acquired from the image server before the position of the mobile terminal changes from an outdoor position to an indoor position, when there is no viewpoint image available of the indoor position at which the mobile terminal is located.

15. A non-transitory computer-readable medium encoded with computer-readable instructions that, when executed by a computer, cause the computer to perform a method comprising:
acquiring, from an image server, a first viewpoint image according to a direction and position of a mobile terminal associated with a first user, the image server storing a plurality of previously-captured viewpoint images obtained by capturing images from a plurality of direction in each of a plurality of positions;
generating, as a display image, a rendering image rendered from a free viewpoint based on the first viewpoint image and a specification of the free viewpoint by a second user who is located at a position different from that of the first user; and
outputting the generated display image.

16. The non-transitory computer-readable medium according to claim 15 further comprising computer-readable instructions to cause the computer to perform a method further comprising acquiring the first viewpoint image when an amount of movement of the mobile terminal exceeds a predetermined threshold value.

17. The non-transitory computer-readable medium according to claim 15 further comprising computer-readable instructions to cause the computer to perform a method further comprising generating the display image by superimposing an icon or marker indicating a position of the first user on a currently displayed display image, without acquiring the first viewpoint image, when a change in position of the mobile terminal is equal to or lower than a predetermined threshold value.

18. The non-transitory computer-readable medium according to claim 15 further comprising computer-readable instructions to cause the computer to perform a method further comprising acquiring the first viewpoint image when the free viewpoint is moved by the second user.

19. The non-transitory computer-readable medium according to claim 15 further comprising computer-readable instructions to cause the computer to perform a method further comprising acquiring the first viewpoint image when the position of the mobile terminal is changed between an indoor position and an outdoor position.

20. The non-transitory computer-readable medium according to claim 19 further comprising computer-readable instructions to cause the computer to perform a method further comprising generating the display image by superimposing an icon or marker indicating a position of the first user on a second viewpoint image acquired from the image server before the position of the mobile terminal changes from an outdoor position to an indoor position, when there is no viewpoint image available of the indoor position at which the mobile terminal is located.

* * * * *